No. 888,677. PATENTED MAY 26, 1908.
C. M. WHITCOMB.
TROLLEY.
APPLICATION FILED APR. 9, 1906.
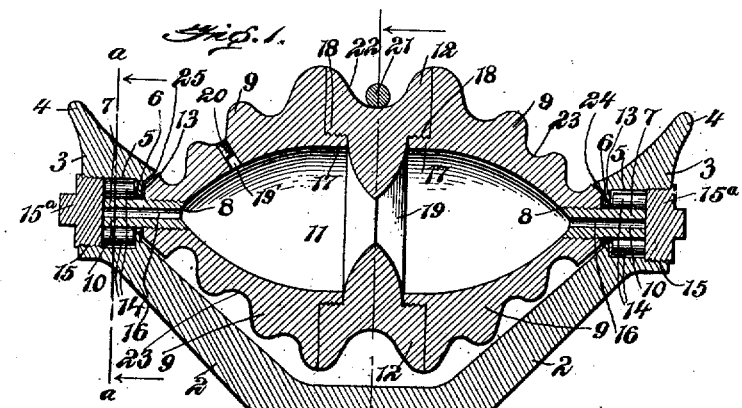
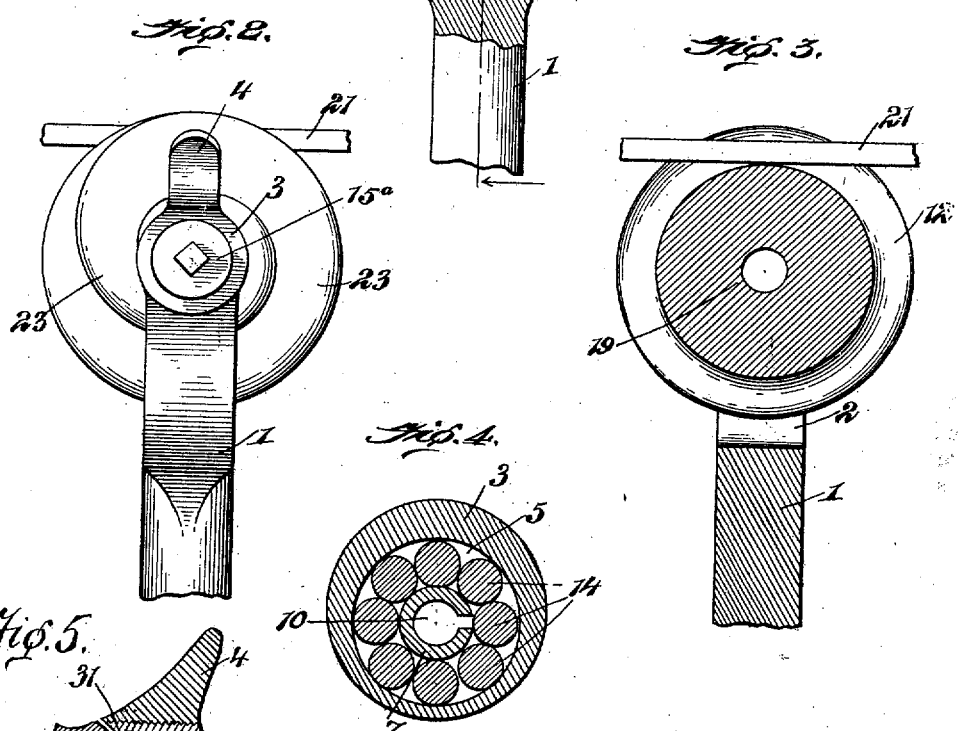
Witnesses
B. M. Offutt
M. R. Meacham
Inventor
Charles M. Whitcomb
By Theodore Dalton
Attorney

UNITED STATES PATENT OFFICE.

CHARLES MYRON WHITCOMB, OF PORTLAND, OREGON.

TROLLEY.

No. 888,677.      Specification of Letters Patent.      Patented May 26, 1908.

Application filed April 9, 1906. Serial No. 310,811.

*To all whom it may concern:*

Be it known that I, CHARLES MYRON WHITCOMB, a citizen of the United States, residing at Portland, in the county of Multnomah and State of Oregon, have invented certain new and useful Improvements in Trolleys, of which the following is a specification.

This invention relates to trolley wheels and their mountings, and has for one of its objects to provide a trolley wheel which will maintain the trolley wire upon the center of the wheel when passing defective overhead switches, cross wires, defectively arranged curves, or curves which have for any reason become disarranged, or when passing at excessive speed around curves, or passing other portions of the line which have a tendency to throw the wheel off of the conductor wire, which obviously often results in the loss of time, the breaking of guy wires, and frequently in tearing down the trolley wire, or the breaking of the poles.

Another object resides in the provision of a sectional wheel whereby it may be readily taken apart for removal or for the purpose of reversing the same with respect to the trolley pole.

A still further object is to provide a trolley wheel so constructed and arranged as to retain oil and permit the distribution to the journal bearings of the wheel.

With the above and other objects in view the invention consists in the combination and arrangement of parts hereinafter referred to, illustrated in the accompanying drawings and particularly pointed out in the appended claims.

In the drawings: Figure 1 is a sectional view illustrating the upper forked end of a trolley pole carrying my improved wheel. Fig. 2 is a side elevation. Fig. 3 is a transverse, sectional view through the center of the wheel. Fig. 4 is a transverse, sectional view on the line *a—a* of Fig. 1, and Fig. 5 is a detail in section of a modified form of the bearing for the trolley wheel.

Referring now more particularly to the accompanying drawings the reference character 1 indicates a trolley pole provided at its upper end with the oppositely disposed, diverging arms 2 terminating at their upper ends in substantially parallel relation, as at 3, to form at the end of each a guard finger 4. The substantially straight portion of each arm is provided with a recess 5 formed from its outer side and the bottom of each recess is provided with a perforation 6 to form a bearing for the reception and support of corresponding journals 7 having a screw threaded engagement in the opening 8 formed in the end of the corresponding end section 9 of the wheel. Obviously, these journal bearings 7 may be formed integrally with the end sections 9 and in any event each journal 7 is hollow with its bore 10 communicating with the corresponding hollow end section 9 to permit the passage thereinto of oil retained normally within the retainer 11 formed by the hollow construction of the end sections 9 and the intermediate or center section 12 hereinafter more specifically referred to. The bottom of each of the aforesaid recesses 5 forms an annular flange 13 to provide one wall of a race way for the roller or other bearings 14, each recess having its outer end enlarged and screw threaded as at 15 to permit of working fit therein of the externally screw threaded cap 15ª which forms the outer wall of said race way. In order to automatically lubricate the roller or other bearings 14 I provide each journal with a slot 16 which communicates with the bore of the journal.

The major end of each end section 9 is provided with an annular flange 17 whose periphery is screw threaded to receive the screw threads of the oppositely disposed annular shoulders 18 formed as a result of reducing the inner periphery of the center or intermediate section 12 to form the strengthening rib 19.

From the foregoing it will be understood that my improved wheel is hollow so that it may contain oil for the automatic lubrication of the bearings and in order to supply the interior of the wheel with oil I provide an oil inlet 19′ in one of the end sections 9 which may be closed in any suitable manner, such, for instance, as a suitable screw cap 20.

The wheel is designed for receiving the trolley wire 21 and holding it normally in the annular groove 22 of the intermediate or center section 12 and under normal conditions the trolley wire will be so maintained. However, in the event of a defective over-head switch, cross-over, sharp curve, excessive speed around curves or by reason of any other abnormal conditions the wheel may be thrown from the trolley wire, but the guards 4 will prevent the wheel being thrown entirely away from the wire, and I also provide means for guiding the wire 12 and returning it to the center or intermediate section of the wheel. To accomplish this latter feature I provide the exterior of each end section with the spiral 23 which will cause the wire to travel thereupon toward the center of the wheel in a manner well understood.

It will be noted that the inner side of the upwardly directed portion 3 of each arm 2 has a tapering projection 24 which coöperates with the corresponding arm 2 and with the corresponding tapering formation 25 at the minor end of each end section to form a cone bearing.

It will now be understood that I provide an improved trolley wheel capable of traveling along the said wire as readily as the usual form of such devices and that I provide means to guard against displacement of the wheel with respect to the wire and also in the event of displacement of the wire with respect to the center of the wheel to return the wire to its center. It will also be appreciated that in view of the detachable relation of the elements embodied in my improved combination I am enabled to remove one element with respect to another at any time it may be desired. To remove the trolley wheel the caps 15ª are detached and the journals 7 removed, when the trolley wheels may be readily lifted out through lateral slots left for that purpose in the trolley forks.

In the modified form of bearing shown in Fig. 5, the roller bearing 14 may be inclosed by a suitable bushing 30, which is provided with an annular flange 31 at its inner end, said flange corresponding in structure and function to the flange 13 on the end of the pole shown in Fig. 1. This bushing is exteriorly screw threaded so as to be removably and adjustably mounted in the guard finger 4 of the pole, and when adjusted the cone bearing of the section 9 of the wheel may be readily tightened or loosened, and of course it facilitates the removal of the section 9 from its cone bearing. This bushing is also interiorly screw threaded from a point intermediate its ends to the outer edge thereof, so that the plug 15ª may be screwed therein as shown. By this construction the entire bearing may be removed by unscrewing the bushing 30, inasmuch as the plug 15ª and the rollers 14 and the flange 31 are all carried by the bushing.

Having thus described my invention, what I claim and desire to secure by Letters Patent is:—

The combination with a trolley pole having spaced arms at one end, the arms terminating in guards, of a hollow wheel made up of intermediate and end sections detachably connected together, the intermediate section having an annular cavity in its periphery and the outer surfaces of the end sections having spiral grooves, each end section also having a fixed hollow journal at one end and each journal having a slot therein, bearings surrounding each journal, a cap arranged at the outer end of each journal to prevent displacement of the bearings, and an opening in one end section to permit of the entrance of oil within the wheel to be contained therein to supply the bearings by way of said journals.

In testimony whereof I have signed my name to this specification in the presence of two subscribing witnesses.

CHARLES MYRON WHITCOMB.

Witnesses:
E. SMITH,
G. F. MARTIN.